Patented Nov. 14, 1933

1,934,711

UNITED STATES PATENT OFFICE 1,934,711

COVERING MATERIAL FOR TIRES AND THE LIKE

Dale G. Higgins, Newburgh, N. Y., assignor to E. I. du Pont de Nemours & Company, Wilmington, Del., a corporation of Delaware No Drawing. Application October 17, 1931 Serial No. 569,542

7 Claims. (Cl. 91—68)

This invention relates to covering materials for tires and other compounded rubber articles containing so-called age resisting materials, or anti-oxidants, and, more particularly, to a light colored covering material for this purpose.

In the manufacture of automobile tires, it is standard practice to employ materials known as age resisting agents, or anti-oxidants, to increase the life of the rubber. Such materials are also used in other compounded rubber articles. Widely used anti-oxidants are sold under the following trade names: V. G. B., Parazone, Albasan, Zalba, Agerite, Neozone A, Neozone B, and Neozone C. These anti-oxidants have a strong tendency to discolor light colored compounds, due to a photochemical reaction and, as a result, are generally used only in dark colored compounded rubber articles.

It has been common practice for a number of years to use a covering for automobile spare tires in order to protect such tires from the effects of the elements, and also to enhance the general appearance of the tire as carried on the automobile. Heretofore these covers have generally been black or a very dark color, but recently there has been a demand for light colored tire covers for use on the so-called sport model cars and in general for the lighter colored cars. The light colored tire covers known today are not satisfactory due to the fact that the antioxidant in the tire migrates into the tire cover and causes bad discoloration. This is true regardless of whether the tire cover comprises merely a textile fabric or a textile fabric coated with a light colored coating composition.

A particular object of the present invention is to provide a covering material for use on tires and other compounded rubber articles containing anti-oxidants that will not be discolored by the anti-oxidants used in the compounded rubber. Other objects of the invention will be apparent from the description given hereinafter.

These objects are accomplished according to the present invention by applying to the side of the fabric to be brought into contact with the tire, or like compounded rubber article, a hydrophilic colloid material. In order that the film of hydrophilic colloid material shall not cause the covering material to be unduly stiff, it is advantageous to employ with the colloid material a substantial proportion of a softener, such as glycerin, although other softeners of this type, such as glycol, diethylene glycol, sulphonated vegetable oils, as for instance, Turkey red oil, and cane sugar syrup or molasses, may be used. As is known in the art, these materials function as softeners because of their hygroscopic properties.

The present invention is broadly applicable to the coating of any type of textile fabric, those commonly used for automobile tire covers being teals, ducks, whipcords, or Burbank cloth, fabrics of this type coated with rubber and, most common of all, fabrics of this type coated with a cellulose nitrate composition. Fabrics coated with cellulose nitrate compositions are the most desirable, since the uncoated fabrics readily fade on exposure to the elements and the fabric has a tendency to deteriorate due to the alternate action of moisture and heat. The rubber coated fabrics can only be supplied in black or very dark colors and, as a consequence, do not reveal discoloration caused by the anti-oxidants to any marked degree.

The following example illustrates a composition containing a hydrophilic colloid adapted to be applied to covering material in accordance with the present invention:

Example 1

| | Per cent |
|---|---|
| Dry casein | 6.8 |
| Water | 21.6 |
| Acetic acid | 14.8 |
| Denatured ethyl alcohol | 31.4 |
| Glycerine | 25.4 |

These ingredients are suitably mixed and just before the material is be applied to the fabric 5% of formaldehyde (40% strength) is added. This composition can be applied to the back of the coated fabric by means of a doctor knife, or other means well known in the art, or can be applied with a brush.

While the above example illustrates a preferred composition according to the present invention, it has been found that the composition can be varied within the following range while still obtaining excellent results:

| | Parts |
|---|---|
| Dry casein | 1–12 |
| Water | 15–30 |
| Acetic acid | 12–17 |
| Denatured ethyl alcohol | 20–35 |
| Glycerine | 20–30 |

Other hydrophilic colloids such as glue, gelatin, albumen, and gum arabic may be used in place of the casein with satisfactory results. In fact, as far as known, any hydrophilic colloid functions satisfactorily in this composition, although casein is preferred. As is known to those familiar with this art, the water and acetic acid in the above composition constitute the dispersing medium. Alkaline dispersing mediums comprising, for example, borax, sodium carbonate, or ammonium hydroxide could also be used but are not preferred where the reverse side of a covering material already coated with a cellulose nitrate composition is being coated, inasmuch as the alkaline dispersing medium has a detrimental effect on the cellulose nitrate coating. The ethyl alcohol is added to the dispersing medium to increase the evaporation rate thereof during deposition of the composition on the fabric. Methyl alcohol could be used in place of ethyl alcohol for this purpose.

The glycerine functions as a softener for the casein through its hygroscopic properties and allows the fabric to retain its supple and pliant properties after the film of hydrophilic colloid material has been deposited thereon. Other softeners well known for this purpose comprise glycol, diethylene glycol, sulphonated vegetable oils, and cane sugar syrup or molasses.

The particular amount of this protective composition deposited per square unit on covering material may be varied widely, but it has been found that from 2-4.5 ounces per square yard of the protective coating, that is, the hydrophilic colloid and softener, if any softener is used, or otherwise the hydrophilic colloid alone, is suitable. A factor to be considered in the amount of protective composition to be deposited per square unit on the covering material is the degree of pliability desired in the covering material. Where a more pliable covering material is desired, the proportion of protective composition per square unit may be reduced.

The most satisfactory type of covering material has applied to its surface that is to be exposed to the elements a cellulose nitrate composition which usually comprises cellulose nitrate, a softener, and a pigment dissolved in a dispersing medium. These compositions may vary widely, and are varied widely in the art today, but the following shows approximate proportions of ingredients which give a satisfactory composition:

| | Per cent |
|---|---|
| Cellulose nitrate | 11.8 |
| Softener | 18.7 |
| Pigment | 13.7 |
| Dispersing medium | 55.8 |

As is well known to those versed in this art, the softener may be any one of numerous cellulose nitrate softeners, such as raw castor oil, blown castor oil, blown cottonseed oil, blown rapeseed oil, dibutyl phthalate, and the like. The dispersing medium usually comprises a mixture of organic esters, such as ethyl acetate, butyl acetate, amyl acetate, ethyl proprionate, and the like, and if desired, a hydrocarbon such as benzol, toluol, xylol of the aromatic series with various fractions of straight chain hydrocarbons, commonly known as gasoline. The exact composition of the cellulose nitrate coating forms no part of the present invention and such compositions are well known in the art.

A covering material having superposed on the side to be brought into contact with compounded rubber articles containing anti-oxidants a film comprising a hydrophilic colloid, prevents the migration of the anti-oxidants into the covering material and consequently prevents the discoloration of the covering material which has quickly discolored in light colored tire covers, and the like, heretofore known. A covering material prepared in accordance with this invention is practically indefinitely proof against discoloration due to the anti-oxidant in the rubber material, whereas the old type covering material is distinctly discolored in a short period. Obviously, covering material made according to the present invention represents a material improvement over that heretofore known with respect to preventing this discoloration, and furthermore, possesses no accompanying unfavorable properties.

While suitable protective compositions have been disclosed showing specific ingredients and the most satisfactory range of proportions, it should be understood that such disclosure is given to specifically illustrate the present invention which broadly comprises covering material on one side of which has been deposited a film including a hydrophilic colloid. Obviously the particular dispersion medium containing the hydrophilic colloid can be widely varied with respect to proportions and ingredients without departing from the spirit of this invention, and softeners may be included or omitted depending on the flexibility desired in the deposited film. Also the invention is applicable to covering material consisting solely of a textile fabric, or to one coated on its outer surface with a cellulose nitrate composition, or any cellulose derivative composition, or other suitable coating composition.

I claim:

1. A tire cover comprising a textile fabric having superposed on its outer surface a light colored cellulose nitrate film and on its inner surface a film comprising casein and glycerine whereby migration of the antioxidant contained in the tire and the resultant discloration of the outer surface of the cover are prevented.

2. A tire cover comprising a textile fabric having an outer surface of a light colored cellulose derivative film and an inner surface of a film comprising a hydrophilic colloid whereby migration of the antioxidant contained in the tire and the resultant discoloration of the outer surface of the cover are prevented.

3. A tire cover comprising a textile fabric having an outer surface of a light colored cellulose derivative film and an inner surface of a film comprising a hydrophilic colloid and a softener whereby migration of the antioxidant contained in the tire and the resultant discoloration of the outer surface of the cover are prevented.

4. A tire cover comprising a textile fabric having an outer surface of a light colored cellulose derivative film and an inner surface of a film comprising casein and a softener whereby migration of the antioxidant contained in the tire and the resultant discoloration of the outer surface of the cover are prevented.

5. A tire cover comprising a textile fabric having an outer surface of a light colored cellulose derivative film and an inner surface of a film comprising casein and glycerine whereby migration of the antioxidant contained in the tire and the resultant discoloration of the outer surface of the cover are prevented.

6. Coated fabric adapted to lie adjacent an antioxidant containing rubber material and comprising a fabric having one surface of a light colored cellulose derivative film and the other surface of a film comprising a hydrophilic colloid, said latter surface intended to lie adjacent said antioxidant containing rubber material whereby migration of the antioxidant contained in said rubber material and the resultant discoloration of the light colored cellulose derivative surface of the fabric are prevented.

7. Coated fabric adapted to lie adjacent an antioxidant containing rubber material and comprising a fabric having one surface of a light colored cellulose derivative film and the other surface of a film comprising casein, said latter surface intended to lie adjacent said antioxidant containing rubber material whereby migration of the antioxidant contained in said rubber material and the resultant discoloration of the light colored cellulose derivative surface of the fabric are prevented.

DALE G. HIGGINS.